United States Patent [19]

Circello

[11] Patent Number: 4,538,237

[45] Date of Patent: Aug. 27, 1985

[54] METHOD AND APPARATUS FOR CALCULATING THE RESIDUE OF A BINARY NUMBER

[75] Inventor: Joseph C. Circello, Phoenix, Ariz.

[73] Assignee: Honeywell Information Systems Inc., Phoenix, Ariz.

[21] Appl. No.: 458,795

[22] Filed: Jan. 18, 1983

[51] Int. Cl.³ .............................................. G06F 7/38
[52] U.S. Cl. ..................................................... 364/746
[58] Field of Search ................................ 364/746, 739

[56] References Cited

U.S. PATENT DOCUMENTS

| | | | |
|---|---|---|---|
| 4,107,783 | 8/1978 | Huang | 364/746 |
| 4,267,580 | 5/1981 | Bond et al. | 364/746 |
| 4,298,952 | 11/1981 | Guenthner et al. | 364/786 |
| 4,363,106 | 12/1982 | Tai | 364/746 |
| 4,418,394 | 11/1983 | Tai | 364/746 |

OTHER PUBLICATIONS

Liu et al., "Residue Generator of Binary Numbers in 2's Complement Form", *IBM Technical Disclosure Bulletin*, vol. 9, No. 2, pp. 158–159, Jul. 1, 1966.

Tai et al., "Optical Residue Arithmetic Computer with Programmable Computation Modules", *Applied Optics*, vol. 18, No. 16, pp. 2812–2823, Aug. 15, 1979.

*Primary Examiner*—James D. Thomas
*Assistant Examiner*—Dale M. Shaw
*Attorney, Agent, or Firm*—A. A. Sapelli; J. S. Solakian; E. W. Hughes

[57] ABSTRACT

Method and apparatus for calculating the residue of a binary number of "n" bits with respect to a given check base m where $m = 2^b - 1$. The binary number is partitioned into segments, each of b bits starting with the least significant bit. If n is not an even multiple of b, higher order bit positions of the segment containing the most significant bit of the number are filled with logical zeros. The segments are applied to levels of carry save adders to reduce the segments of the binary number to a single sum segment of b bits and a single rotated carry segment of b bits where a rotated carry segment is a carry segment produced by a carry save adder, the most significant bit of which is rotated so that it becomes the least significant bit of the rotated carry segment. Carry segments produced by carry save adders of one level are converted to rotated carry segments before being applied to a carry save adder of a lower level carry save adder. The single sum segment and single rotated carry segment produced by the lowest level carry save adder are applied to a 1's complement full adder. The b bit output of the 1's complement full adder is the residue of the binary number with respect to the check base $(2^b - 1)$.

12 Claims, 3 Drawing Figures

METHOD AND APPARATUS FOR CALCULATING THE RESIDUE OF A BINARY NUMBER

BACKGROUND OF THE INVENTION

1. Field of the Invention

This invention is in the field of methods and apparatus for calculating the residue of a binary number with respect to a predetermined check base. The residues of such numbers can be used in the binary and arithmetic unit of a digital data processing system to check the accuracy of arithmetic operations performed on two operands, each of which operations produces a result.

2. Description of the Prior Art

To assure the accuracy of arithmetic operations on binary numbers in digital data processors, there is a need to validate such operations. Various ways of doing this have been developed, such as by parallel execution of the same operation on the same operands, or the use of parity checks at each stage of an operation. Another way to validate the accuracy of arithmetic operations such as addition, subtraction, multiplication, and division of binary numbers is to validate each operation using residue theory mathematics in which the residue (r) of a number, or operand, "X" is the remainder resulting from the division of "X" by the check base "m" or $$X = km + r$$

where k is an integer constant such that r is equal to or greater than 0 and less than m. A common representation of this definition is $$r = |X|m.$$

Any arithmetic operation $\phi$ performed on two operands A and B which produces a resultant R can be represented as $$R = \phi(A,B).$$

The basic residue theory check equation is $$|R|m = \phi(|A|m, |B|m).$$

Thus, the residue of the resultant R is equal to the operation $\phi$ performed on the residues of the operands A and B. The operation $\phi$ performed on the residues is defined as being executed in modulo m arithmetic. The significance of the foregoing is that, if an arithmetic operation is performed on two operands, then the residue of the result of that operation will equal the same operation performed on the residues of the two operands, it being a requirement that all residues are determined with respect to the same check base m. Residue checking has the advantage that it will detect all single bit errors in the resultant R.

To use residue checking to verify the accuracy of arithmetic operations requires digital apparatus for calculating the residues of the operands and the residue of the resultant of each such operation. There also is a requirement for arithmetic logic to perform the same operation on the residues of the operands as is performed on the operands themselves. Finally, there is a need for comparator logic to compare the residues of the resultants calculated both ways to ascertain that they are the same.

Since division of one binary number by another normally requires more time and logic to accomplish than any other binary arithmetic operation, it is necessary to implement the mathematical operation that will effectively divide an operand or resultant by the check base without performing the actual division. It is known that the residue r of X, an n bit binary number, with respect to a check base $m = 2^b - 1$, can be calculated by partitioning X into segments of b bits per segment and by adding the segments using 1's complement addition until the segments are reduced to a single segment of b bits with the single segment being the residue r of X.

The comparative slowness of 1's complement adders such as that disclosed in U.S. Pat. No. 4,298,952, which issued on Nov. 3, 1981, has heretofore significantly reduced the usefulness of residue checking to verify the accuracy of arithmetic operations on large binary number operands in high-speed digital data processing systems. There is, therefore, a need for a significantly faster method and apparatus for calculating the residues of binary operands.

BRIEF SUMMARY OF THE INVENTION

The present invention provides both method and apparatus for more quickly calculating the residue of a binary number X of "n" bits with respect to a check base "m". The binary number X is divided or partitioned into segments of "b" bits each. The value of $m = (2^b - 1)$ in which equation m and n are limited to being integers other than zero. The segments of the binary number are applied to carry save adders, each of which has the capability of adding three segments and of producing a sum segment and a carry segment with each segment consisting of b bits per segment. Carry save adders are also sometimes called half adders. The carry save adders of the invention can be considered as being arranged in levels, with the lowest, or last, level consisting of a single carry save adder. The bits of the carry segments produced by each carry save adder are rotated so that the most significant bit of a carry segment becomes the least significant bit of the corresponding rotated carry segment with the other bits of the rotated carry segment being shifted to the left one bit position which causes the additions to be in the 1's complement notation. The sum segment and rotated carry segments from the lowest level carry save adder are applied to a 1's complement full adder. The sum segment produced by the full adder is the residue of the binary number with respect to check base m.

It is, therefore, an object of this invention to provide improved methods and apparatus for calculating the residue of a binary number with respect to a given check base.

It is another object of this invention to provide faster methods and apparatus for calculating the residue of a binary number with respect to a given check base.

BRIEF DESCRIPTION OF THE DRAWINGS

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

FIG. 3 illustrates the manner in which the bits of a carry segment are rotated to produce a rotated carry segment.

DETAILED DESCRIPTION

Figure 1:
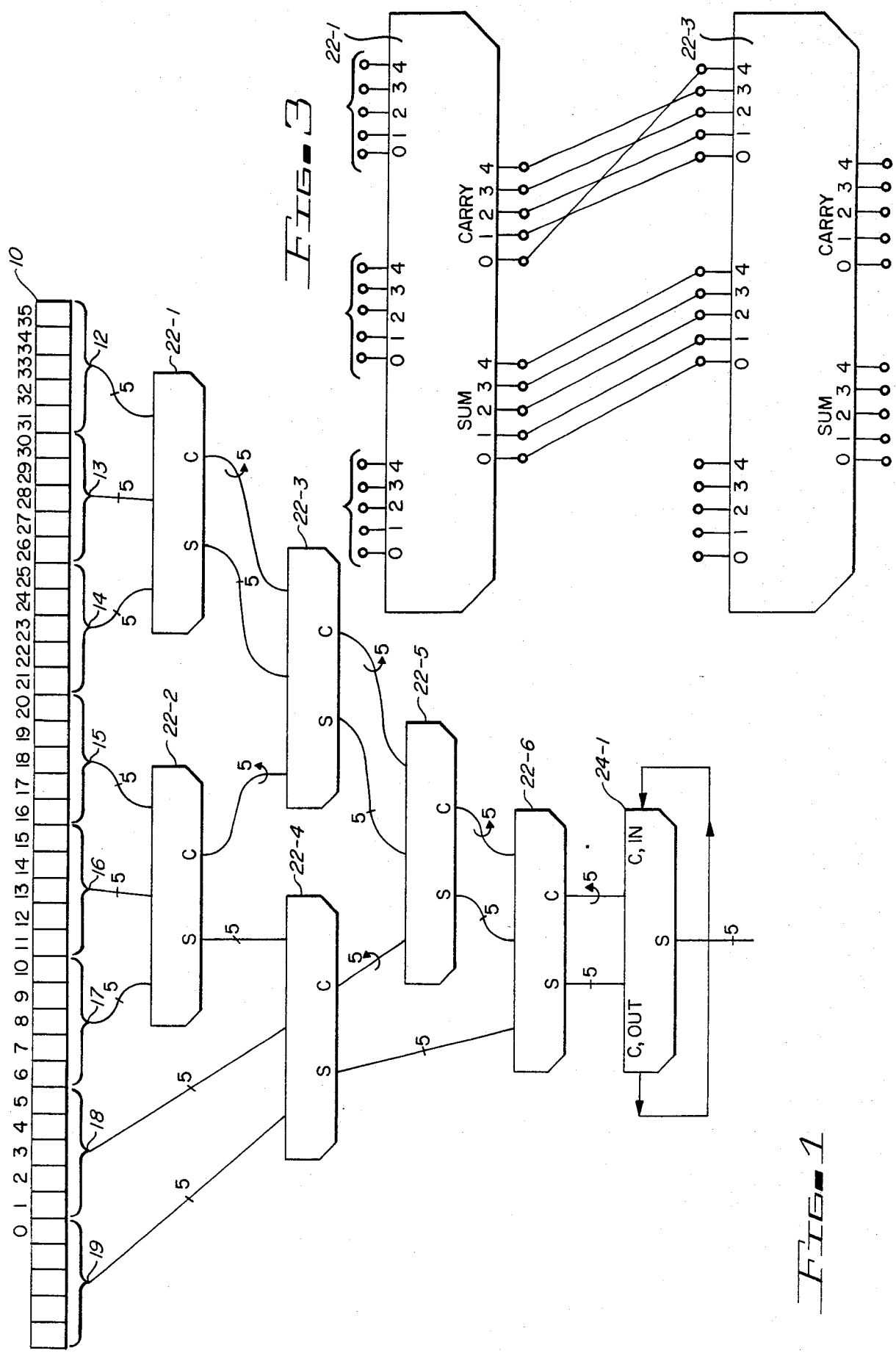
FIG. 1 is a schematic block diagram of apparatus of the invention for calculating the residue of a 36-binary number with respect to a check base of m = 31.

In FIG. 1, operand 10 is a thirty-six bit binary number, the residue of which is to be calculated with respect to a check base m. In the preferred embodiment m=31. Since $m=2^b-1$, b, the number of bits in a segment in the preferred embodiment, is 5. The value of b is, of course, subject to choice and can be any integer which is greater than 1 with values typically being 3, 4, 5, etc. In FIG. 1, the bits of operand 10 are partitioned into eight segments 12-19, each of five contiguous bits beginning with segment 12 which includes the least significant bit 35 of operand 10. The most significant bit of operand 10, bit 0, is the least significant bit of segment 19. The higher order bit positions of segment 19 are filled with logical 0's from the output of a bistable device such as a flip flop, or by being connected to ground if a logical zero is defined as being ground potential. The number of segments into which operand 10 is partitioned is equal to the quotient obtained by dividing n the number of bits of operand 10 by divisor b the number of bits per segment, rounded up to the next integer if there is a remainder.

The signals of segments 12-19 of binary number 10 are applied to the input terminals of selected ones of carry adders 22-1 to 22-6. Carry save adders 22, in the preferred embodiment, each has the capability of adding three sets, or segments, of input signals, each of five bits in the preferred embodiment, and of producing a set of signals representing the sum of the applied segments, a sum segment of five bits and a set of signals representing the carries of the applied segments, a carry segment of five bits.

In FIG. 3, the manner of connecting the signals of the sum and carry segments produced by carry save adder 22-1 to two of the three sets of input terminals of carry save adder 22-3 are illustrated. Particular attention is directed to the manner of connecting the signals of the carry segment produced by carry save adder 22-1 to one of the three sets of input terminals of carry save adder 22-3. The signals of the carry segment produced by carry save adder 22-1 are rotated, or shifted, to the left with the most significant bit, bit 0 of the carry segment being connected to the least significant input terminal, terminal 4 of one of three sets of input terminals of carry save adder 22-3. Each of the other bits of the carry segment are shifted to the left one bit position so that each occupies a more significant bit position in the rotated carry segment applied to the input terminals of carry save adder 22-3. Summarizing, connecting the signals of a carry segment to the input terminals of a lower level adder, as illustrated in FIG. 3, produces a rotated carry segment. The manner in which this is accomplished in the preferred embodiment is by the use of a bus of five conductors, one for each of the five bits of a carry segment, which connect the carry output terminals of carry save adder 22-1 to one of three sets of input terminals of carry save adder 22-3.

Figure 2:
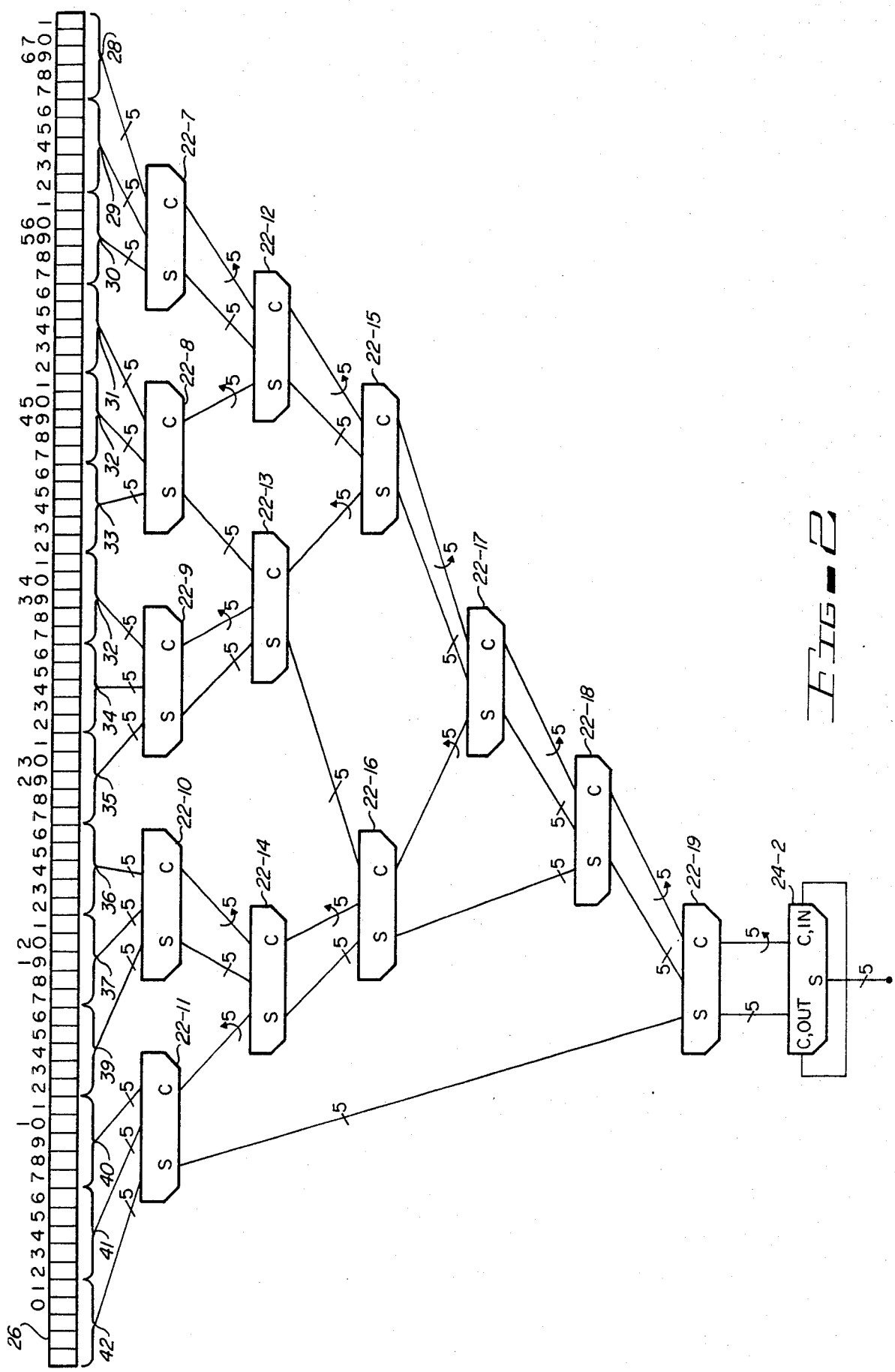
FIG. 2 is a similar schematic diagram of apparatus for calculating the residue of a 72-binary number with respect to a check base of m=31.

In FIGS. 1 and 2, a bus for a segment of five bits is illustrated as being a single line. A bus with a curved arrow intersecting it rotates the signals of a carry segment produced by a carry save adder 22 to produce a rotated carry segment, the signals of which are applied to a set of input terminals of another carry save adder as illustrated in FIG. 3, or to a 1's complement full adder. In FIGS. 1 and 2, a bus with a short diagonal straight line intersecting it applies the bits of a sum segment to the input terminals of another adder 22, 24 for example, without changing the order of the bits of the segment, the manner in which the signals of the sum segment produced by carry save adder 22-1 are connected to one set of input terminals of FIG. 3. The number 5 proximate the curved arrows or the short diagonal straight lines of each of the buses identifies the number of conductors of the bus.

In FIG. 1, the signals of segments 12, 13, and 14 are the inputs to carry save adder 22-1, and those of segments 15, 16, and 17 are the inputs to carry save adder 22-2. Carry save adder 22-1 and 22-2 constitute the highest level of carry save adders 22 in FIG. 1. The next lower level of carry save adders 22 consists of carry save adders 22-3 and 22-4. Carry save adder 22-3 has applied to it as inputs the rotated carry segment signals of carry save adder 22-1, the sum segment signals of carry save adder 22-1 and the rotated carry segment signals of carry save adder 22-2. Carry save adder 22-4 has applied to it as inputs the sum segment signals of carry save adder 22-2 and the signals of segments 18 and 19 of binary number 10. The next lower level of carry save adders 22 consists of carry save adder 22-5 which has applied to it as one input the rotated carry segment signals of carry save adder 22-3 and as a second input the signals of the sum segment of carry save adder 22-3. The third input to carry save adder 22-5 is the rotated carry segment signals of carry save adder 22-4. The next lowest, the fourth level of carry save adders, carry save adder 22-6, has as its inputs the rotated carry segment signals and sum segment signals of carry save adder 22-5 and the sum segment signals of carry save adder 22-4. It should be noted that carry save adder 22-6 is the lowest level carry save adder. By the time the signals of the segments of binary number 10 have passed through the higher levels of carry save adder 22, and then through adder 22-6, they have been reduced to a single sum segment and a single carry segment.

The function of carry save adder 22-1 through 22-6 is to add the segments 12-19 and to reduce them as quickly and efficiently as possible to a single sum and a single rotated carry segment representing the addition in 1's complement notation of the segments of the binary number 10 and of all intermediate sums and carry segments. The signals representing the sum and rotated carry segments produced by carry save adder 22-6, the lowest level carry save adder, are applied to 1's complement full adder 24-1, which is described and claimed in U.S. Pat. No. 4,298,952, which issued on Nov. 3, 1981. The five bits of the sum segment produced by 1's complement adder 24-1 is the residue of the operand 10 to the check base 31.

The number of carry save adders 22 and the number of levels of such adders required to calculate the residue of a binary number X is a function of the number of bits of the binary number X whose residue r is to be calculated and the choice of the check base m which determines the number of bits b per segment into which X is partitioned. It should be noted that the order in which the segments are added is not critical, it only being necessary that the signals of all the segments of X be applied to a carry save adder and that the sum and rotated carry save adder outputs be applied to additional or lower level carry save adders until reduced to a single sum and a single rotated carry segment which is produced by the lowest level carry save adder, adder 22-6 in FIG. 1.

The advantage of implementing the apparatus for calculating the residue of a binary number to a given check base as illustrated in FIG. 1 is that carry save adders 22 function at approximately 3 to 4 times the speed of a corresponding full adder, as a result the residue of a binary number can be determined and be available for use in verifying the accuracy of an arithmetic operation several times quicker than if the determination of the residue were calculated using only one's complements full adders.

In FIG. 2, the apparatus for determining the residue with respect to the check base of m=31 of a 72-bit operand 26 is illustrated. Operand 26 is divided, or partitioned, into segments 28–42 of five bits per segment. The least significant bit of segment 28 is the least significant bit 71 of operand 26. The remaining segments and the bits comprising them continue in order until segment 42 is reached which includes the most significant bit of operand 26, in this case bit 0. The partition between segments 41 and 42 occurs between bit positions 2 and 1. Thus, bits 1 and 0 occupy the lower order bit positions of segment 42. The higher order bit positions of segment 42 are filled with zeros by a conventional source of signal such as a flip flop, or by being connected to ground if a logical zero is defined as being ground potential. In FIG. 2, the number of segments into which a 72-bit operand 26 is partitioned is 15. Thus, segments 28–42 can be and are illustrated as being applied to the first level of carry save adders 22-7 to 22-11. The sums and rotated carry segments produced by adders 22-7 to 22-11 are then applied to a second level of carry save adders 22, namely, adders 22-12, 22-13, and 22-14. The third level of carry save adders 22 consists of carry save adders 22-15 and 22-16 which have sum and rotated carry segments from the preceding level of carry save adders 22 applied to them. To reduce the segments of operand 26 to a single sum segment and a single carry segment requires a fourth, a fifth, and a sixth, level of carry save adders 22 with the lowest level consisting of carry save adder 22-19. The sum and rotated carry segments produced by adder 22-19 are applied to the input terminals of the one's complement full adder 24-2. The sum segment of five bits produced by full adder 24-2 is the residue of the 72-bit operand 26.

In FIG. 2, as in FIG. 1, a line with an intersecting short straight line represents a bus in which the order of signals of the segment transmitted by that bus remains the same; i.e., they are not rotated. A line with an intersecting curved arrow represents a bus in which the conductor carrying the most significant bit of a carry segment is connected to the least significant input terminal of succeeding carry save adder or full adder. The number associated with the intersecting short straight line or curved arrow identifies the number of conductors of the bus.

The implementation and method of using carry save adders of this invention has the benefit of significantly increasing the speed at which the residues of binary numbers are calculated. That capability then makes practical the use of residues to check the arithmetic operations performed on large binary numbers in a binary computer. The number of bits in a segment is a matter of choice as is the number of bits of a binary number. The manner of connecting buses to apply the signals of segments between levels of adders is also a matter of choice. To minimize the time to calculate a residue as well as the amount of logic required, it is most desirable that the signals of three segments be applied to each carry save adder to reduce the segments, or cause the results to converge to a single rotated carry segment and single sum segment after passing through the minimum number of carry save adders.

From the foregoing, it is believed obvious that the method and apparatus of this invention provides a faster way of calculating the residue of a binary number with respect to a given check base having the form of $m=2^2-1$.

What is claimed is:

1. Apparatus for calculating the residue of a binary number with respect to a check base, said binary number being partitioned into a plurality of equal sized segments, with each segment including b contiguous bits where b is an integer greater than one, comprising:
   carry save adder means for adding the segments of the binary number and for reducing said segments to a single sum segment and a single rotated carry segment the single rotated carry segment being a carry segment wherein each bit position of the carry segment is increased in its bit significance by one, and further wherein the most significant bit is rotated to the least significant bit position; and
   one's complement full adder means for adding said single sum segment and single rotated carry segment to produce the residue of said binary number with respect to said check base.

2. Apparatus as defined in claim 1 in which the check base equals the quantity $2^b-1$.

3. Apparatus as defined in claim 2 in which b=5.

4. Apparatus as defined in claim 3 in which the number of bits in the binary number is a multiple of 9.

5. Apparatus for calculating the residue of a binary number of "n" bits with respect to a check base "m", said binary number being partitioned into a segment of "b" contiguous bits beginning with the least significant of the binary number, higher order bit positions of the segment containing the most significant bit of the binary number, being filled by logical 0's, where $m=2^b-1$ and m, n and b are integers greater than 1, comprising:
   levels of carry save adders for adding the bits of the segments of the binary number and for producing a sum segment and a carry segment, the lowest level of the carry save adders consisting of a single carry save adder, means for rotating the bits of each carry segment produced by each carry save adder so that the most significant bit of each carry segment becomes the least significant bit of its corresponding rotated carry segment;
   circuit means for applying the segments of the binary number and the sum and the rotated carry segments to carry save adders to reduce them to a single sum segment and a single rotated carry segment produced by the lowest carry save adder;
   a one's complement full adder for producing the residue of b bits of the binary number; and
   circuit means for applying the sum and rotated carry segments of the lowest level carry save adder to the full adder.

6. The apparatus of claim 5 in which b=5.

7. The apparatus of claim 6 in which n equals a multiple of 9.

8. The apparatus of claim 7 in which the means for rotating the bits of each carry segment includes a bus having conductors for each bit of each carry segment and in which the conductor of the most significant bit of the carry segment is adapted to be connected to the least significant input terminal of a lower level adder.

9. The method of calculating the residue of a binary number with respect to a given check base, comprising the steps of:
   partitioning the binary number into segments, each segment consisting of a plurality of contiguous bits beginning with the least significant bit of the binary number;
   filling higher order bit positions of the segment containing the most significant bit of the binary number with logical zeroes;
   applying the segments into which the binary number is partitioned to a plurality of carry save adders each carry save adder producing a sum segment and a carry segment;
   rotating the bits of the carry segments to form rotated carry segments in which the most significant bit of each carry segment becomes the least significant bit of the corresponding rotated carry segment;
   applying any segments into which the binary number is partitioned not previously applied to a carry save adder, sum segments and rotated carry segments to additional carry save adders until all the segments into which the binary number is partitioned and all rotated carry and sum segments are reduced to a single sum segment and a single rotated carry segment; and
   adding the single sum segment and the single rotated carry segment in a one's complement full adder to produce the residue of said binary number.

10. The method of claim 9 in which b is an integer greater than 2.

11. The method of claim 10 in which the check base equals the quantity $2^b - 1$.

12. The method of claim 11 in which b equals 5.

* * * * *